US009674388B2

United States Patent
Sato et al.

(10) Patent No.: US 9,674,388 B2
(45) Date of Patent: Jun. 6, 2017

(54) INFORMATION PROCESSING APPARATUS, INFORMATION PROCESSING SYSTEM, AND INFORMATION PROCESSING METHOD THAT ACCEPT A CONFIGURATION OF A COOPERATIVE OPERATION

(71) Applicants: Tadashi Sato, Kanagawa (JP); Hiroyuki Sakuyama, Tokyo (JP); Takayasu Oe, Kanagawa (JP); Naoki Shimizu, Kanagawa (JP); Genki Umeizumi, Tokyo (JP); Takuya Mori, Tokyo (JP); Junki Aoki, Kanagawa (JP)

(72) Inventors: Tadashi Sato, Kanagawa (JP); Hiroyuki Sakuyama, Tokyo (JP); Takayasu Oe, Kanagawa (JP); Naoki Shimizu, Kanagawa (JP); Genki Umeizumi, Tokyo (JP); Takuya Mori, Tokyo (JP); Junki Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/642,935

(22) Filed: Mar. 10, 2015

(65) Prior Publication Data

US 2015/0264197 A1    Sep. 17, 2015

(30) Foreign Application Priority Data

Mar. 17, 2014 (JP) .................................. 2014-052998
Feb. 26, 2015 (JP) .................................. 2015-037258

(51) Int. Cl.
*G06F 3/12* (2006.01)
*H04N 1/00* (2006.01)
*G06K 15/00* (2006.01)

(52) U.S. Cl.
CPC ......... *H04N 1/0096* (2013.01); *G06F 3/1205* (2013.01); *G06F 3/1253* (2013.01);
(Continued)

(58) Field of Classification Search
CPC ...... G06F 3/1215; G06F 3/126; G06F 3/1296; H04N 2201/0094
(Continued)

(56) References Cited

U.S. PATENT DOCUMENTS 6,256,107 B1 *  7/2001  Toda ................... H04N 1/00411
                                                   358/1.13
2006/0268304 A1 * 11/2006  Tanaka ................. G06F 3/1204
                                                   358/1.13
(Continued)

FOREIGN PATENT DOCUMENTS

JP    2007-156736    6/2007
JP    2013-058012    3/2013

*Primary Examiner* — Gabriel Garcia
(74) *Attorney, Agent, or Firm* — Oblon, McClelland, Maier & Neustadt, L.L.P.

(57) ABSTRACT

An information processing apparatus includes an acceptance unit that accepts a configuration of a cooperative operation to be performed by multiple apparatuses cooperating with each other, an execution order determination unit that determines an executing order of processes included in the cooperative operation, an apparatus determination unit that identifies, for each of the processes included in the cooperative operation, an apparatus that performs the process, and a controller that instructs the identified apparatus to execute the processes included in the cooperative operation in the determined executing order.

6 Claims, 14 Drawing Sheets

(52) U.S. Cl.
CPC .......... *G06F 3/1275* (2013.01); *G06F 3/1285* (2013.01); *G06F 3/1215* (2013.01); *H04N 2201/0094* (2013.01)

(58) Field of Classification Search
USPC ............... 358/1.1, 1.9, 1.13, 1.15, 1.18, 402
See application file for complete search history.

(56) References Cited

U.S. PATENT DOCUMENTS

| | | | |
|---|---|---|---|
| 2008/0184236 A1* | 7/2008 | Yamauchi | G06F 9/5011 718/100 |
| 2010/0079800 A1* | 4/2010 | Muto | H04N 1/32106 358/1.15 |
| 2011/0261387 A1* | 10/2011 | Sato | G06F 3/1204 358/1.14 |
| 2012/0162682 A1* | 6/2012 | Tomiyasu | G06F 3/1222 358/1.13 |
| 2013/0057882 A1 | 3/2013 | Ohta | |

* cited by examiner

FIG. 13
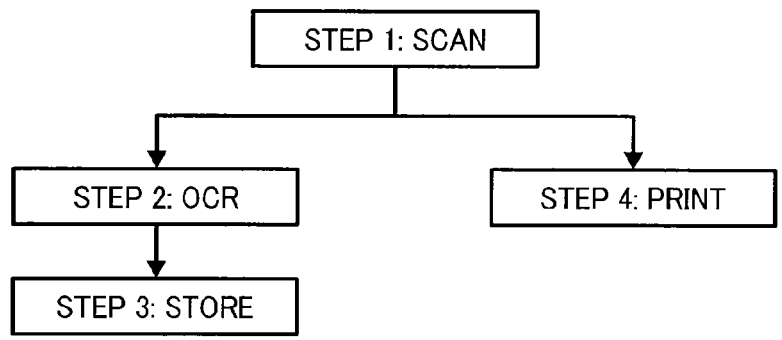
FIG. 14
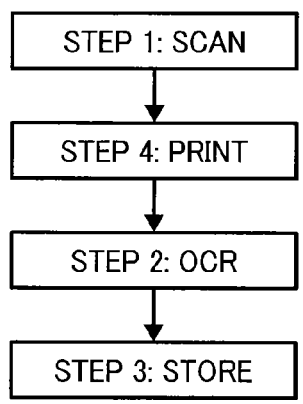
FIG. 15
| PROCESS | PRIORITY |
|---|---|
| SCAN | 1 |
| COPY | 2 |
| PRINT | 3 |
| OCR | 4 |
| STORE | 5 | ations No. 2014-052998, filed on Mar. 17, 2014 and No. 2015-037258, filed on Feb. 26, 2015 in the Japan Patent Office, the entire disclosure of which is hereby incorporated by reference herein.

BACKGROUND

Technical Field

The present invention relates to an information processing apparatus, an information processing system, and an information processing method.

Background Art

Recently, a technology that implements processes that cannot be implemented by one image forming apparatus by using multiple image forming apparatuses and executing jobs by operating those image forming apparatuses cooperating with each other is well known.

For example, in implementing a predetermined process flow, a technology that controls cooperation between apparatuses using virtual distance has been proposed, in which the predetermined process flow is carried out using high-priority services that are selected from among services provided by the apparatuses in accordance with a predetermined constrained condition.

SUMMARY

An example embodiment of the present invention provides a novel information processing apparatus that includes an acceptance unit that accepts a configuration of a cooperative operation to be performed by multiple apparatuses cooperating with each other, an execution order determination unit that determines an executing order of processes included in the cooperative operation, an apparatus determination unit that identifies, for each of the processes included in the cooperative operation, an apparatus that performs the process, and a controller that instructs the identified apparatus to execute the processes included in the cooperative operation in the determined executing order.

Further example embodiments of the present invention provide a non-transitory recording medium storing an information processing apparatus control program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 13 is a diagram illustrating a process executing specified four steps as an embodiment of the present invention.

FIG. 14 is a diagram illustrating a determined order of processing steps as an embodiment of the present invention.

FIG. 15 is a diagram illustrating priorities of processes as an embodiment of the present invention.

DETAILED DESCRIPTION

Figure 1:
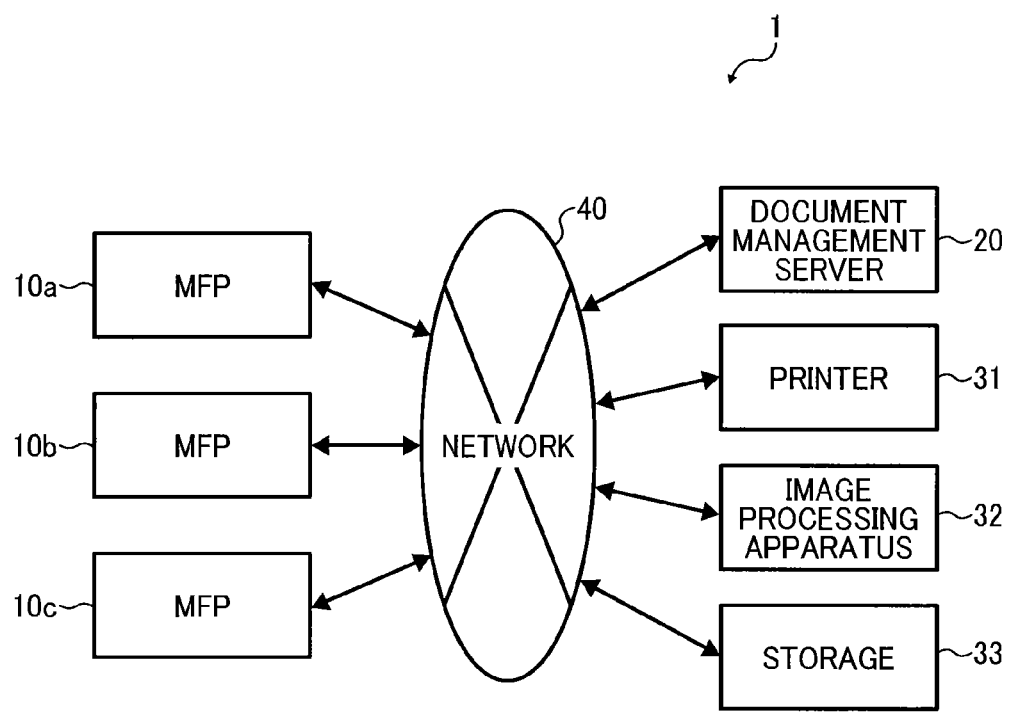
FIG. 1 is a diagram illustrating a configuration of an image processing system including a multifunction peripheral (MFP) as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional technology described above, since a predetermined processing flow is used, an actual executing order of an operation is fixed, and unintended waiting time could occur in some cases. For example, while it is desired to acquire a specific output (e.g., printed matter), the output process takes place lastly in the operation.

The issue described above can happen in case of cooperatively operating any multiple apparatuses other than the image forming apparatuses.

In the following embodiment, in cooperating multiple apparatuses, the cooperative operation can be executed in an appropriate order.

FIG. 1 is a diagram illustrating a configuration of an image processing system including MFPs in this embodiment.

As shown in FIG. 1, in an image processing system 1, apparatuses that can be involved in a cooperative operation (a cooperative job if it is considered as one job) executed by multiple apparatuses that cooperate with each other are connected with each other communicably via a network 40. More specifically, MFPs 10a to 10c, a document management server 20, a printer 31, an image processing apparatus 32, and a storage apparatus 33 are connected to the network 40.

Among them, each of the MFPs 10a to 10c corresponds to the image processing apparatus that can provide multiple functions such as scanning, printing, copying, and faxing etc. In the description shown below, the MFPs 10a to 10c are collectively referred to as the MFP 10 if it is unnecessary to identify as an individual apparatus. It should be noted that it is unnecessary that all apparatuses include the same hardware, and it is possible that each apparatus can provide different functions. For example, one apparatus can scan color documents and print out color documents, another apparatus only can scan and print out monochrome documents, and yet another apparatus cannot scan color documents but can print out color documents etc.

In addition, the MFP 10 includes an application to accept an instruction regarding the cooperative operation through user operation. Accordingly, the MFP 10 can be used as a user terminal on which the operation regarding the cooperative operation is instructed by the user.

The document management server 20 is an information processing apparatus that provides functions such as storing documents and processing documents. An example case of processing a document is to perform an Optical Character Recognition (OCR) process on document data that includes images acquired by scanning the document and generate document data on which the processing result is added as transparent texts (hereinafter referred to as "OCR" process). In this case, an example of the document data is Portable Document Format (PDF) data.

The printer 31 is the image forming apparatus that provides a printing function.

The image processing apparatus 32 is the image processing apparatus that provides an image processing function.

The storage apparatus 33 is the information processing apparatus that provides a document storing function.

The apparatuses shown in FIG. 1 are examples of apparatuses that provide various functions that can be used in the cooperative operation, and the number of apparatuses and the types of apparatuses are not limited to this example. If a new apparatus is connected to the network 40 and the apparatus that controls the cooperative operation (e.g., the MFP 10a) can detect the new apparatus, the new apparatus can also be used for the cooperative operation. If the new apparatus is disconnected from the network 40, it is just that the new apparatus cannot be used for the cooperative operation any longer.

Figure 2:
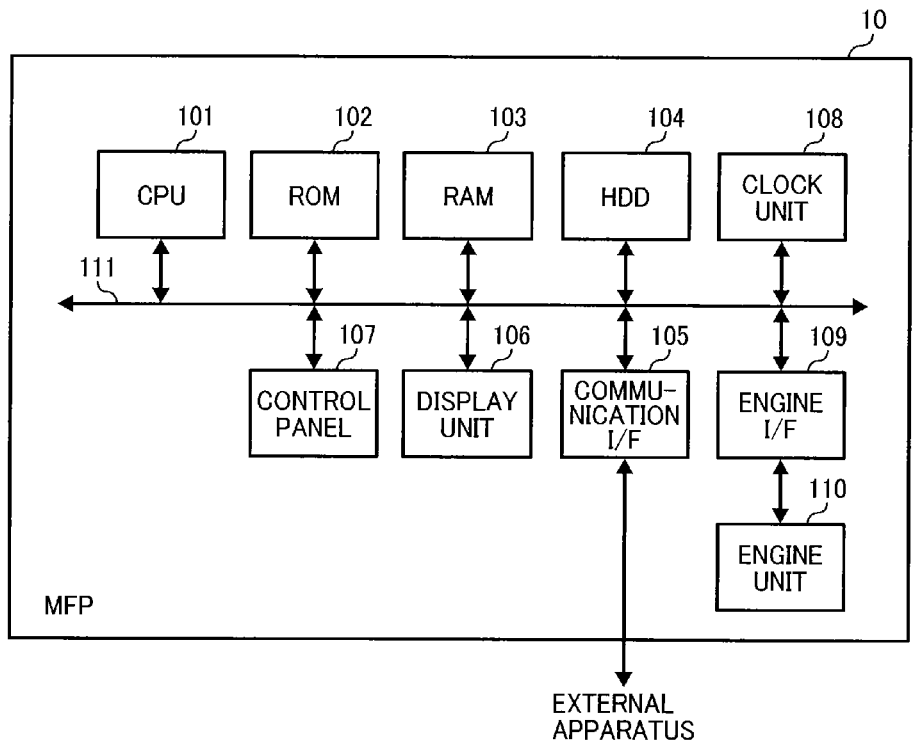
FIG. 2 is a diagram illustrating a hardware configuration of the MFP in FIG. 1 as an embodiment of the present invention.

FIG. 2 is a diagram illustrating a hardware configuration of the MFP 10 in this embodiment.

As shown in FIG. 2, the MFP 10 includes a CPU 101, a ROM 102, a RAM 103, a hard disk drive (HDD) 104, a communication interface (I/F) 105, a display unit 106, a control panel 107, a clock unit 108, and an engine I/F 109, and those components are connected with each other via a system bus 111. In addition, an engine unit 110 is connected to the engine I/F 109.

The CPU 101 controls the entire MFP 10 by executing a program stored in the ROM 102 or the NVRAM 104 using the RAM 103 as a work area, and various functions (such as functions described later with reference to FIG. 3) can be implemented. Examples of those functions include to accept configuration regarding the cooperative operation and to determine an executing order of processes included in the configured cooperative operation.

The HDD 104 is a non-volatile memory (storing unit) and store various programs to be executed by the CPU 101 and various data.

The communication I/F 105 is an interface to communicate with external apparatuses such as another MFP via the network 40.

The display unit 106 is such as a display that presents information for user.

The control panel 107 is an operational unit that allows a user input, for example, through various keys, buttons, or a touch panel.

The display unit 106 and the control panel 107 can be external, and the MFP 10 can accept operation from an external terminal via the network.

The clock unit 108 is a clock with function that keeps current time.

The engine I/F 109 is an interface that connects the engine unit 110 to the system bus 111 so that the CPU 101 can control the engine unit 110.

The engine unit 110 is a mechanism that includes an image forming unit that forms an image on paper, an image scanning unit that scans an image on paper, a paper feeding unit that mounts paper on which an image is formed and feeds the paper, and the paper transferring unit that transfers paper, to perform various operations other than communication and information processing such as image forming operation. As described above, each apparatus can include different functions.

Regarding the configuration of other apparatuses in FIG. 1, while the detailed configuration of each unit such as the engine unit is different in accordance with the apparatus, the fundamental configuration is similar to the MFP 10.

The image processing system described above determines the executing order of processes included in the executed operation using the algorithm describe below in case of executing the cooperative operation.

Figure 3:
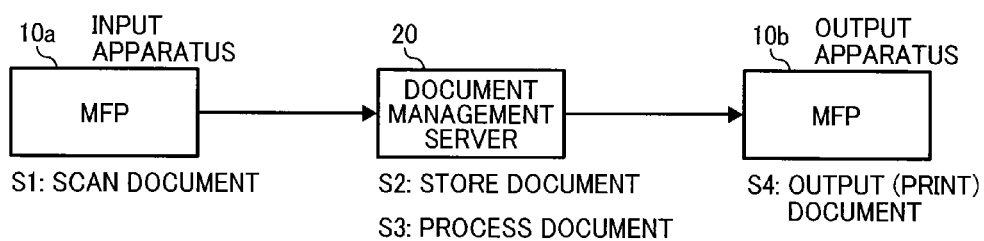
FIG. 3 is a diagram illustrating a cooperative operation in the image processing system in FIG. 1 as an embodiment of the present invention.

FIG. 3 is a diagram illustrating a cooperative operation in the image processing system in FIG. 1 in this embodiment.

In the cooperative operation illustrated in FIG. 3, first, the MFP 10a functions as an input apparatus and scans a document in S1. Subsequently, the MFP 10a transfers image data acquired by scanning the document to the document management server 20 and instructs the document management server 20 to store the image data of the document in its HDD in S2. In addition, the document management server 20 processes the stored image data such as the OCR etc. in S3. After that, the document management server 20 transfers the stored image data to the MFP 10b that functions as an output apparatus and instructs the MFP 10b to print out a printed document based on the image data in S4.

An apparatus that functions as a control apparatus that controls the cooperative operation (i.e., MFP 10a in this case) determines an executing order of steps S1 to S4 in the cooperative operation described above and instructs each apparatus that handles each step to perform each step. In this case, in case of instructing an apparatus that handles the next step (i.e., the document management server 20 in this case) to perform executing the next step, it is preferable to instruct the document management server 20 with information indicating how to instruct an apparatus that handles the further next step (i.e., the MFP 10*b* in this case).

Figure 4:
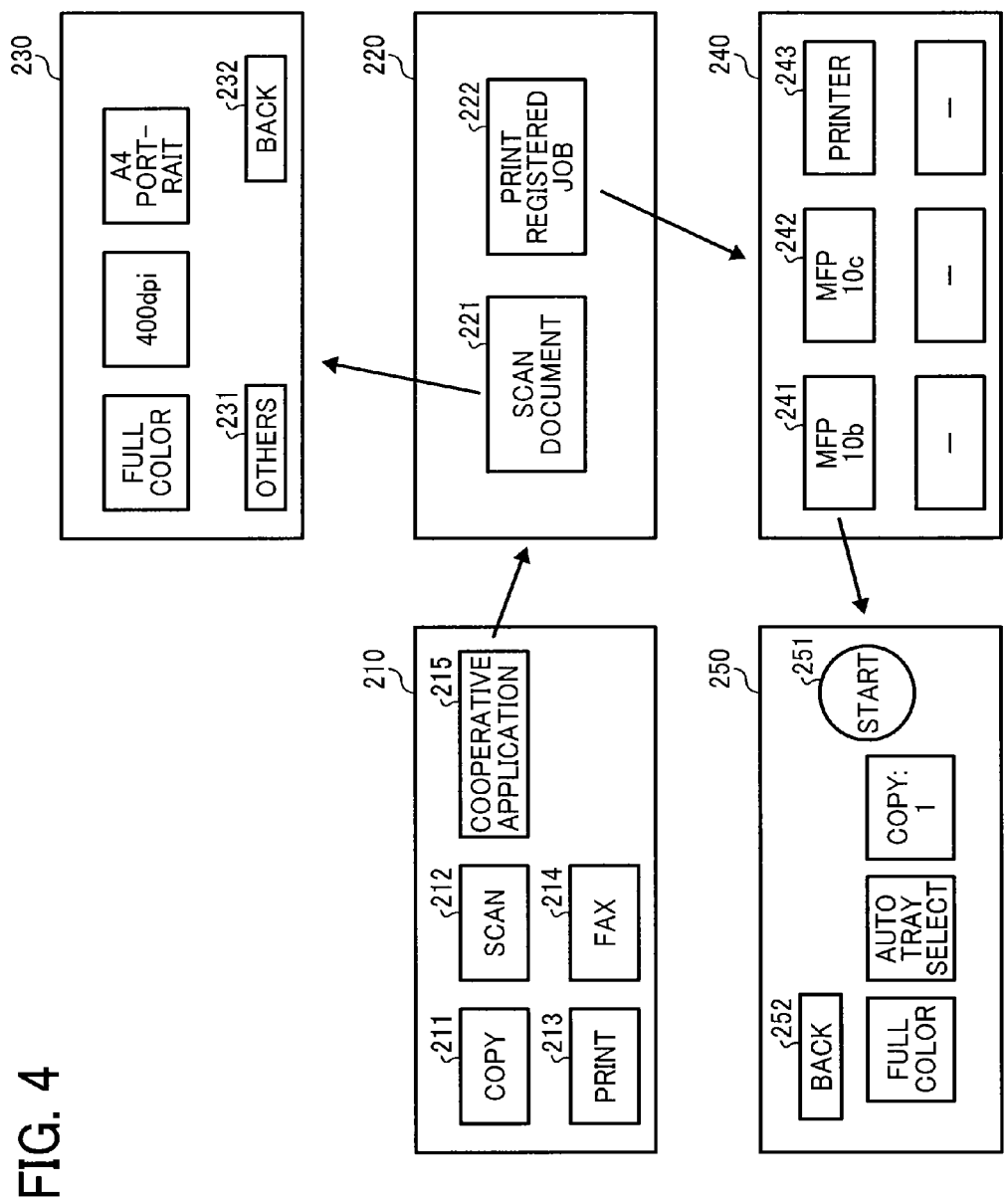
FIG. 4 is a diagram illustrating a screen for accepting a configuration of the cooperative operation by user operation as an embodiment of the present invention.

FIG. 4 is a diagram illustrating a screen for accepting a configuration of the cooperative operation by user operation in this embodiment.

Transitions of screens displayed on the display unit 106 when the MFP 10*a* accepts a configuration of the cooperative operation by user operation are shown in FIG. 4.

First, a function selection screen 210 is a screen that allows a user to select a function to be used from among functions that the MFP 10*a* can provide. A copy button 211, a scan button 212, a print button 213, and a FAX button 214 are buttons for selecting a function that the MFP 10*a* provides. A cooperative application button 215 is a button for selecting a function to control the cooperative operation (a cooperative application). If the cooperative application button is selected by the user, the MFP 10*a* transitions the screen to a cooperative function selection screen 220.

The cooperative function selection screen 220 is a screen that allows the user to select a main step to be configured from among the steps performed in the cooperative operation. In FIG. 4, it is assumed that an operation that inputs image data by scanning a document and prints out based on the image data is performed, and a scan configuration button 221 and a print configuration button 222 are provided as main elements of the cooperative operation. The scan configuration button 221 is a button to proceed to a configuration regarding scanning a document. The print configuration button 222 is a button to proceed to a configuration regarding printing.

If the scan configuration button 221 is operated in the cooperative function selection screen 220 by user operation, the MFP 10*a* transitions the screen into a scan configuration screen 230 to accept configurations regarding scanning a document. In this case, the MFP 10*a* operated by a user handles scanning the document, and the scan configuration screen 230 is a screen for accepting configurations regarding the scanning function provided by the MFP 10*a*.

In addition, if an others button 231 is pressed by user operation, the MFP 10*a* transitions the screen into a screen (not shown in figures) for accepting configurations of functions other than printing performed on the scanned image. Here, the configurable processes are storing in a document box and the OCR process etc. for example. It is possible that the MFP 10*a* does not perform those processes. The MFP 10*a* holds a list of apparatuses that can be used for the cooperative operation among apparatuses connected to the network 40 and a list of functions that the listed apparatuses can provide. If the others button 231 is pressed by user operation, the MFP 10*a* extracts available functions from the listed functions and transitions to a screen that selects a function to be used and accepts configurations of the selected function.

If a back button 232 is operated by user operation, the MFP 10*a* transitions the screen back into a cooperative function selection screen 220.

If the print configuration button 222 is operated by user operation on the cooperative function selection screen 220, the MFP 10*a* transitions the screen into an output apparatus selection screen 240. The output apparatus selection screen 240 is a screen that allows selecting an apparatus that performs printing by user operation. The MFP 10*a* extracts apparatuses that provide the printing function from the list of apparatuses and functions available for the cooperative operation described above and displays buttons corresponding to those extracted apparatuses on the output apparatus selection screen 240. In FIG. 4, buttons 241 to 243 that correspond to the MFP 10*b*, the MFP 10*c*, and the printer are displayed. Symbols "-" are displayed on other buttons indicating that there is no corresponding apparatus.

If any one of buttons 241 to 243 is pressed on the output apparatus selection screen 240 by user operation, it is considered that the apparatus is selected as the output apparatus used for printing. Subsequently, the MFP 10*a* transitions the screen to a print configuration screen 250 that accepts configurations regarding printing. The print configuration screen 250 is a screen that accepts configurations regarding the printing function that the selected apparatus can provide, and its screen design is different in accordance with functions that the selected apparatus can provide.

It is possible to instruct to start performing the cooperative operation by setting configurations on the print configuration screen 250 and operating a start button 251 by user operation. If it is desired to configure other functions, it is possible to go back to the cooperative function selection screen 220 by operating the back button 252.

In the screens described above, it is possible to configure the process to be executed and the apparatus used for outputting in the cooperative operation and instruct to start the cooperative operation by user operation.

Figure 5:
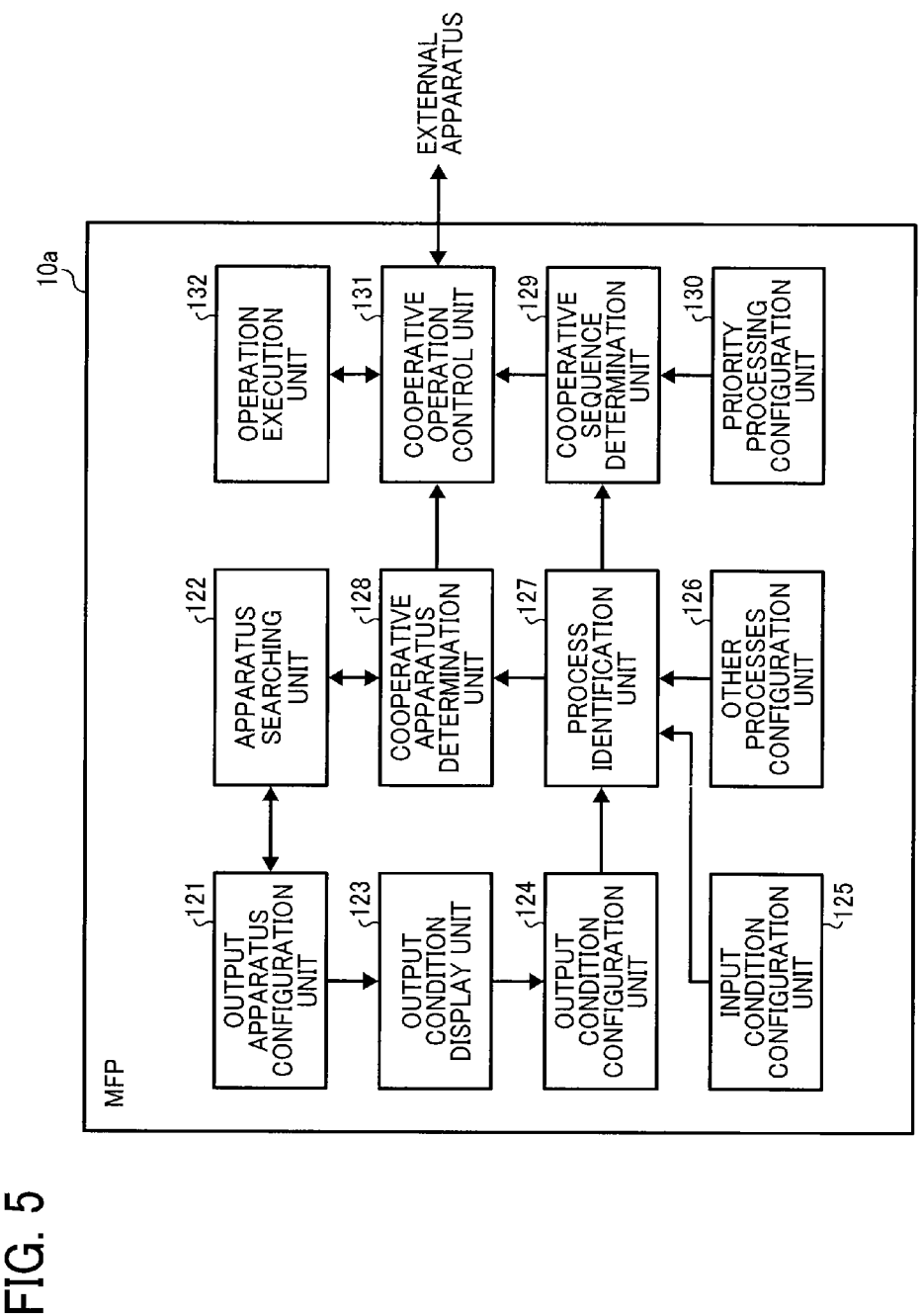
FIG. 5 is a diagram illustrating a configuration of a function related to the cooperative operation included in the MFP in FIG. 1 as an embodiment of the present invention.

FIG. 5 is a diagram illustrating a configuration of a function related to the cooperative operation included in the MFP 10*a* in this embodiment.

As shown in FIG. 5, the MFP 10*a* includes an output apparatus configuration unit 121, an apparatus searching unit 122, an output condition display unit 123, an output condition configuration unit 124, an input condition configuration unit 125, an other processes configuration unit 126, a process identification unit 127, a cooperative apparatus determination unit 128, a cooperative sequence determination unit 129, a priority processing configuration unit 130, a cooperative operation control unit 131, an operation execution unit 132.

Among those units described above, similar to the description of the output apparatus selection screen 240, the output apparatus configuration unit 121 can configure the apparatus used as the output apparatus in the cooperative operation in accordance with user instruction.

The apparatus searching unit 122 extracts information on an apparatus and a function from the list of apparatuses and functions available for the cooperative operation described above and provides the information. For example, the apparatus searching unit 122 provides the list of apparatuses that can be used as the output apparatus.

The output condition display unit 123 displays setting items and selections of output provided by the output apparatus configured by the output apparatus configuration unit 121 on the print configuration screen 250 for example.

The output condition configuration unit 124 configures settings regarding the output process performed in the cooperative operation in accordance with user instruction on the setting items and the selections displayed by the output condition display unit 123.

The input condition configuration unit 125 configures settings regarding the input process performed in the cooperative operation in accordance with user instruction accepted on the screen such as the scan configuration screen 230.

The other processes configuration unit 126 configures processes other than the input process and the output process performed in the cooperative operation in accordance with user instruction.

Based on the configuration by the output condition configuration unit 124, the input condition configuration unit 125, and the other processes configuration unit 126 when it is instructed to start the cooperative operation, the process identification unit 127 identifies a process to be executed in order to perform the cooperative operation in accordance with the configuration described above. In this case, examples of the identified process are scanning an image, printing, storing a document, and the OCR etc.

The cooperative apparatus determination unit 128 is an apparatus determination unit and determines an apparatus that executes the process identified by the process identification unit 127. Here, the MFP 10*a* scans an image, and the apparatus that the output apparatus configuration unit 121 configures performs printing. Therefore, the cooperative apparatus determination unit 128 determines an apparatus that executes other processes. In this case, it is possible that the apparatus searching unit 122 provides information on performance that the apparatus that can execute the process or other apparatus performs the process, and it is possible to determine the apparatus based on the provided information.

The cooperative sequence determination unit 129 is a unit to determine an executing order and determines an order of executing steps identified by the process identification unit 127. There are many algorithms to perform this determination, and those algorithms are described later in detail with reference to a flowchart.

The priority processing configuration unit 130 is a configuration unit that configures a process to be prioritized among the cooperative operation in accordance with user instruction or some criteria automatically and provides its information to the cooperative sequence determination unit 129.

The cooperative operation control unit 131 is a control unit that controls executing the cooperative operation by instructing the apparatus determined by the cooperative apparatus determination unit 128 to execute each process that the process identification unit 127 identifies in order of executing that the cooperative sequence determination unit 129 determines.

The operation execution unit 132 executes the process that the MFP 10*a* executes in the cooperative operation.

Next, a process that the CPU 101 in the MFP 10*a* executes regarding the cooperative operation described above is described below.

Figure 6:
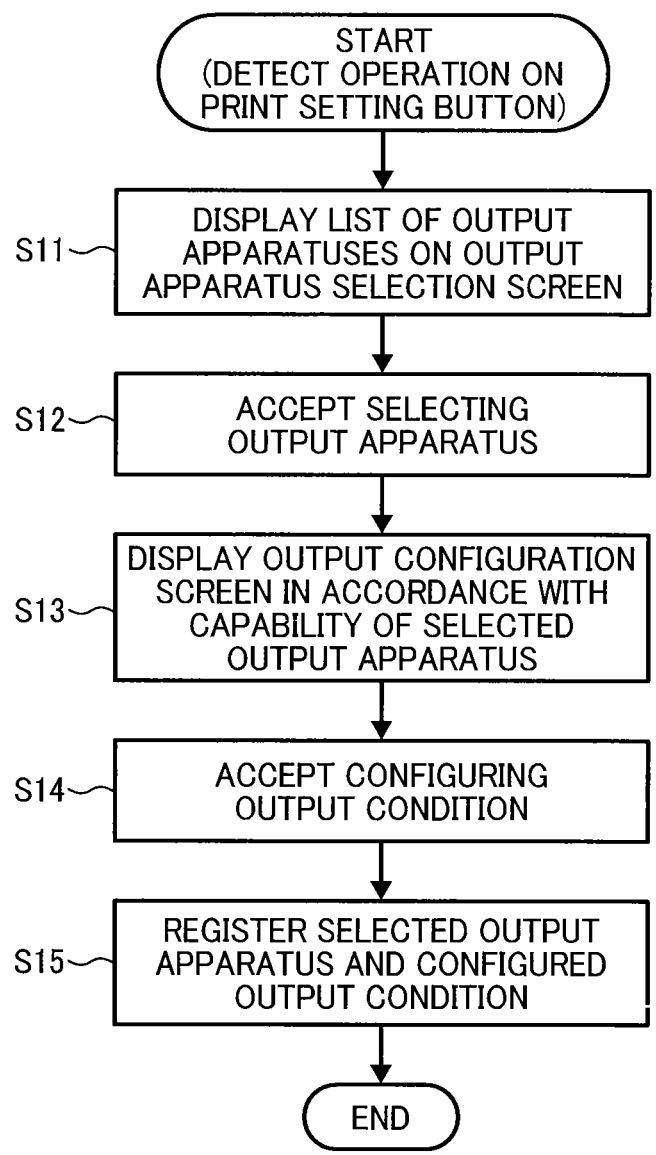
FIG. 6 is a flowchart illustrating a process that a CPU in the MFP executes if a print button is operated as an embodiment of the present invention.

FIG. 6 is a flowchart illustrating a process executed if the print button 222 is operated in this embodiment.

After detecting that the print configuration button 222 is operated in the cooperative function selection screen 220, the CPU 101 starts a process shown in the flowchart in FIG. 6.

Subsequently, the CPU 101 displays a list of apparatuses that can be selected on the output apparatus selection screen 240 in S11. In FIG. 4, each button indicates each output apparatus.

After that, the CPU 101 accepts selecting the output apparatus in S12. In FIG. 4, the CPU 101 accepts the selection using the buttons that correspond to each output apparatus.

Subsequently, the CPU 101 displays the output configuration screen to accept setting the output condition in accordance with the capability of the selected output apparatus in S13. The print configuration screen 250 in FIG. 4 corresponds to the output configuration screen described above.

After that, the CPU 101 accepts setting the output condition configured on the displayed output configuration screen in S14 and registers the output apparatus selected in S12 and the output condition configured in S14, and the process ends.

As described above, it is possible to accept and register the configuration on outputting in the cooperative operation by user operation. The process described above corresponds to the functions of the output apparatus configuration unit 121, the output condition display unit 123, and the output condition configuration unit 124.

The CPU 101 also accepts and registers a configuration on inputting and a configuration on processes other than inputting and outputting similarly (not shown in figures). It should be noted that a process regarding selecting the apparatus cannot be included.

Figure 7:
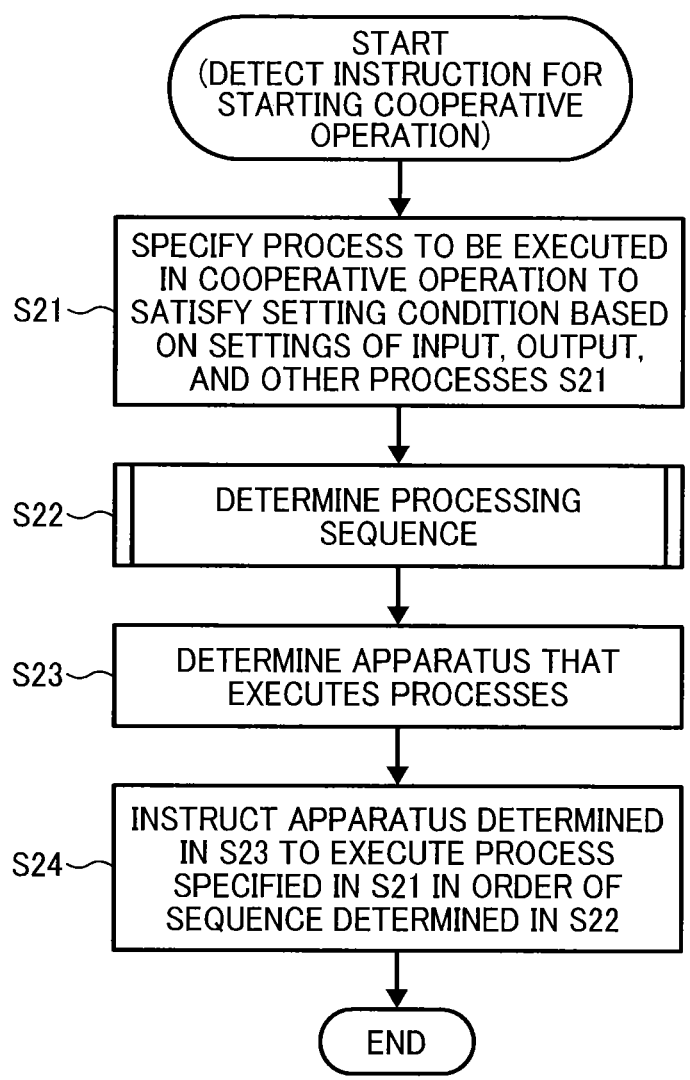
FIG. 7 is a flowchart illustrating a process in case of instructing to start executing the cooperative operation as an embodiment of the present invention.

FIG. 7 is a flowchart illustrating a process in case of instructing to start executing the cooperative operation in this embodiment.

After detecting that it is instructed to start executing the cooperative operation by operating the start button 251 etc., the CPU 101 starts a process shown in the flowchart in FIG. 7.

First, based on the configuration on the input, output, and other processes registered in FIG. 6 etc., processes to be executed in the cooperative operation to satisfy the configured condition are specified in S21. For example, regarding outputting, it is desired to satisfy the configured output apparatus and the configured output condition.

In this case, the specified processes described above are not only processes instructed to execute directly. For example, in case of instructing to print out a scanned document and perform OCR on the scanned document, in addition to scanning and printing out the document, if it is desired to store the image data temporarily to perform OCR, the storing step is also specified. If the input apparatus cannot transfer the image data to the output apparatus directly due to a security setting etc., it is desired to store the image data to print out the image data. Step S21 corresponds to the function of the process identification unit 127.

Subsequently, the CPU 101 executes the processing order determination process and determines the executing order of processes specified in S21. There are some determining methods for the determination process described above, and three methods are described later with reference to FIGS. 8 to 10. Step S22 corresponds to the function of the cooperative sequence determination unit 129.

After that, in S23, the CPU 101 determines the apparatus that executes the steps specified in S21. After that, in S24, the CPU 101 instructs the apparatus determined in S23 to execute each process specified in S21 in the order of executing determined in S22. Subsequently, the process ends. Step S23 corresponds to the function of the cooperative apparatus determination unit 128, and step S24 corresponds to the function of the cooperative sequence determination unit 129.

As described above, it is possible to execute the cooperative operation in accordance with user configuration by the apparatuses that consist of the image processing system 1.

Figure 8:
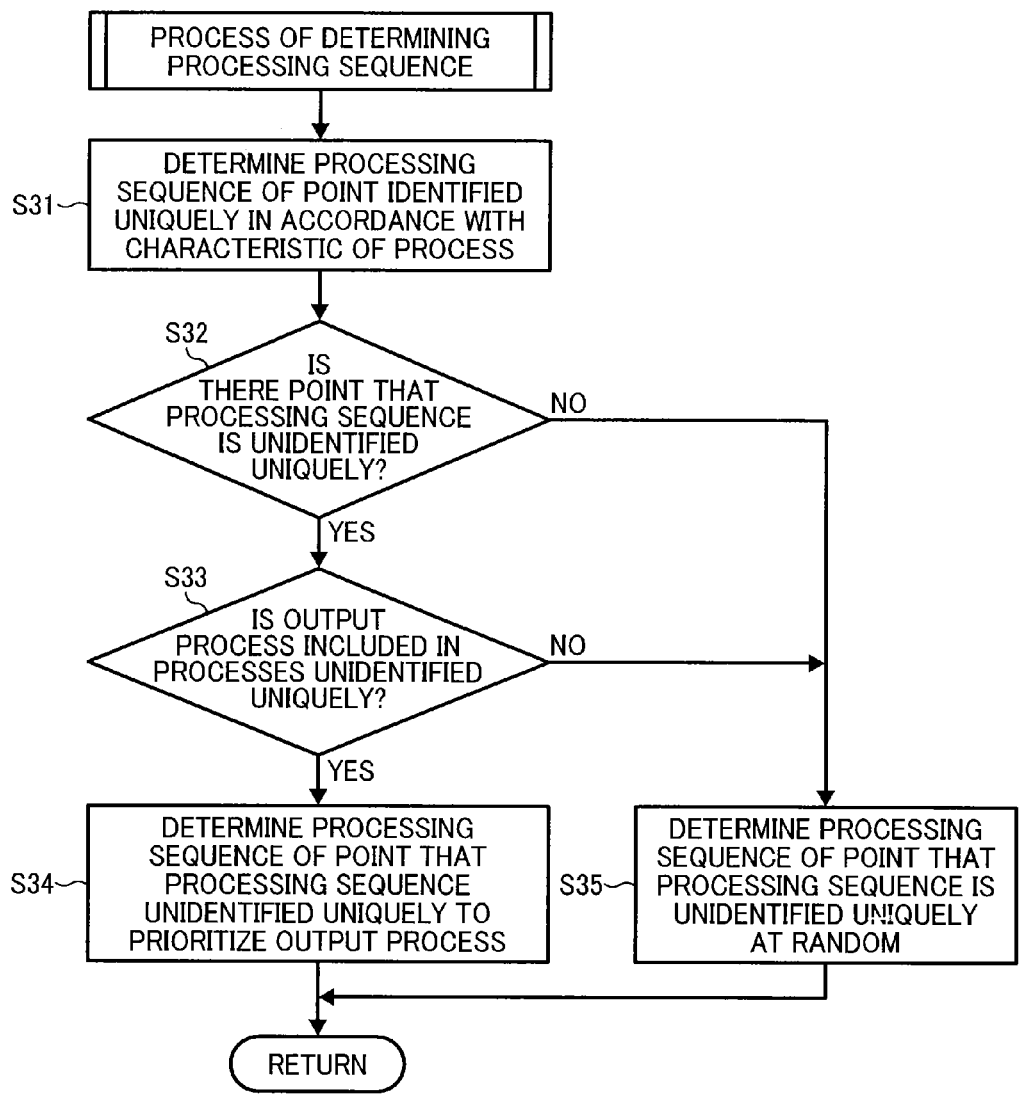
FIG. 8 is a flowchart illustrating a process of determining a processing order executed in S22 in FIG. 7 as an embodiment of the present invention.

FIG. 8 is a flowchart illustrating a process of determining a processing order executed in S22 in FIG. 7 in this embodiment.

In this case, first, among the steps specified in S21, the CPU 101 determines a processing order of steps that can be determined uniquely in accordance with the characteristic of the steps in S31. For example, in order to print out the scanned document and perform OCR on the scanned document, in case of executing scanning, printing out, performing OCR, and storing the image data, since it is desired to perform scanning first before performing other steps, the step to be executed firstly can be determined uniquely. In addition, if it is impossible to perform printing out and OCR before storing the image data, the step to be executed after scanning can be determined uniquely.

Subsequently, the CPU 101 determines whether or not steps whose processing order could not be determined uniquely in S32. As described above, it is not determined uniquely whether performing OCR or printing out the document is to be executed in advance.

In case of YES in S32, the CPU 101 determines whether or not the steps that cannot be determined uniquely include the outputting step configured by the output condition configuration unit 124 in S33.

In case of YES in S33, the CPU 101 determines the processing order of the steps that cannot be determined uniquely in S31 so that the outputting step is executed preferentially in S34 and goes back to the former process. In case of NO in S32 of S33, the CPU 101 determines the processing order of the steps that cannot be determined uniquely in S31 randomly in S35 and goes back to the former process. In this case, the processing order is determined without specific restriction, and it is unnecessary to determine the processing order forcibly randomly. For example, it is possible to execute process that is previously configured firstly.

The determination by the processing sequence determination process described above corresponds to determining the executing order in the cooperative operation so that time from starting the cooperative operation to finishing outputting by the specified output apparatus becomes short.

In this embodiment, the outputting step configured by the output condition configuration unit 124 is printing out, and it is desired to wait for the printed matter in front of the output apparatus and get the printer matter. Accordingly, it is highly user-convenient to shorten the waiting time in front of the output apparatus by determining the processing order so that the time until finishing outputting the printed matter. This case can be similar if the cooperative operation includes user-outputting steps other than printing out.

Figure 9:
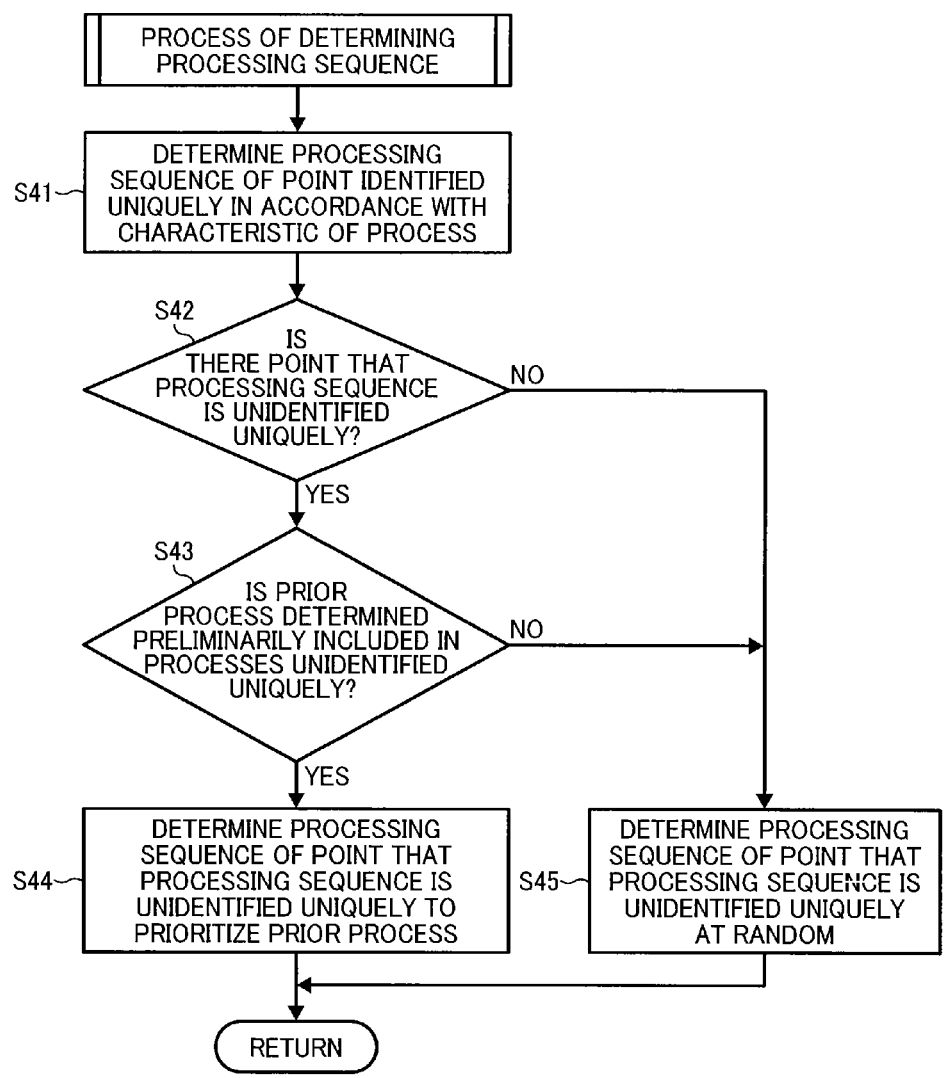
FIG. 9 is a flowchart illustrating another process of determining a processing order executed in S22 in FIG. 7 as an embodiment of the present invention.

FIG. 9 is a flowchart illustrating another process of determining a processing order executed in S22 in FIG. 7 in this embodiment.

In this process, step S41 is similar to step S31 in FIG. 8, and step S42 is similar to step S32 in FIG. 8, so those descriptions are omitted.

In case of YES in S42, the CPU 101 determines whether or not the steps that cannot be determined uniquely include the prioritized step configured by the prioritized process configuration unit 130 in S43.

In case of YES in S43, the CPU 101 determines the processing order of the steps that cannot be determined uniquely in S31 so that the prioritized step is executed preferentially in S44 and goes back to the former process. In case of NO in S42 or S43, just the same as in the case of S35 in FIG. 8, the CPU 101 determines the processing order of the steps that cannot be determined uniquely in S41 randomly in S45 and goes back to the former process.

The determination by the processing sequence determination process described above corresponds to determining the executing order in the cooperative operation so that time from starting the cooperative operation to finishing the prioritized step configured preliminarily becomes short.

As described above, if the step that it is preferred to get the execution result as soon as possible is configured as the prioritized step preliminarily, it is possible to get the executing result quickly and shorten the waiting time. As a result, the cooperative operation can be highly convenient.

Figure 10:
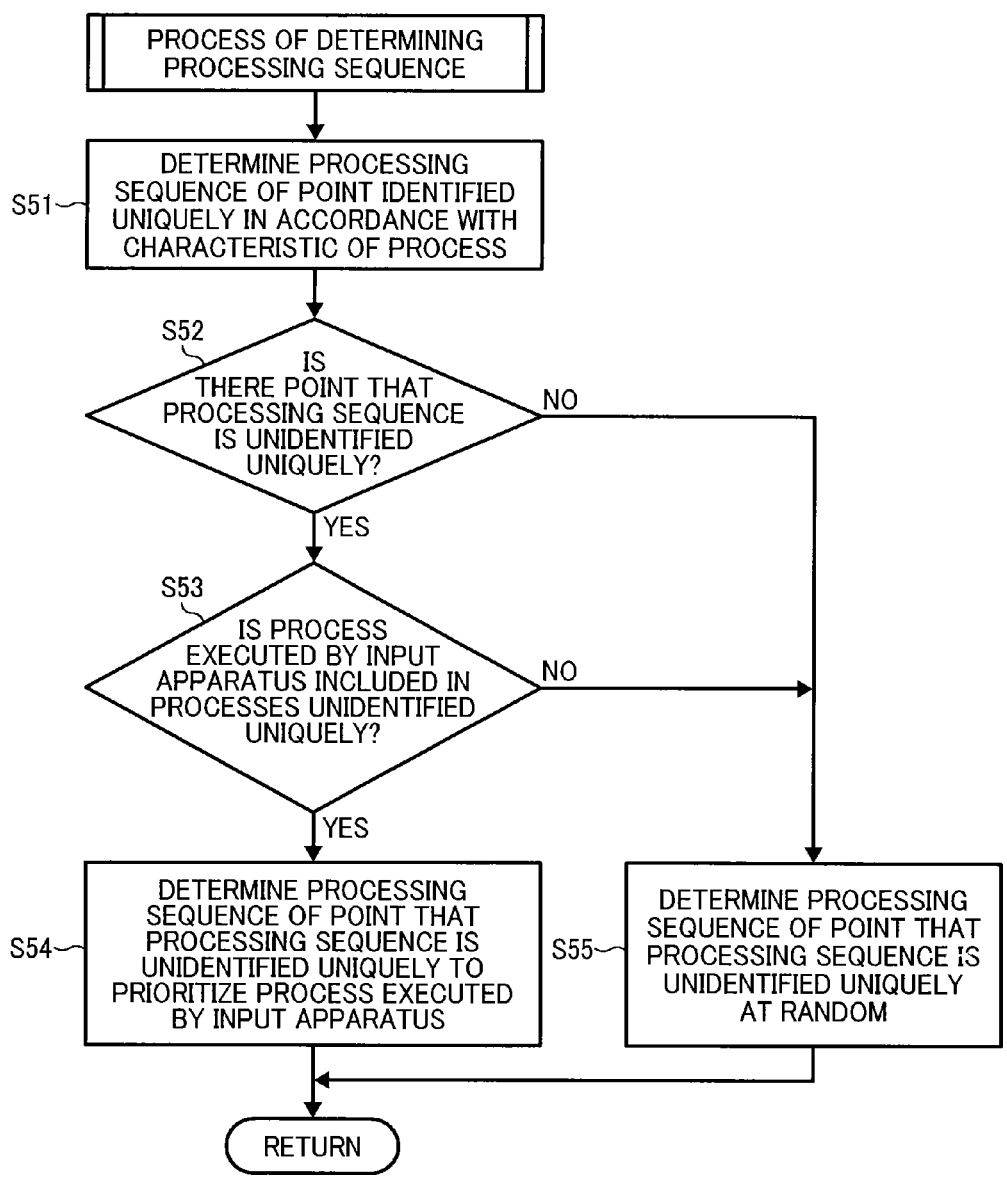
FIG. 10 is a flowchart illustrating yet another process of determining a processing order executed in S22 in FIG. 7 as an embodiment of the present invention.

FIG. 10 is a flowchart illustrating yet another process of determining a processing order in this embodiment.

In this process, step S51 is similar to step S31 in FIG. 8, and step S52 is similar to step S32 in FIG. 8, so those descriptions are omitted.

In case of YES in S52, the CPU 101 determines whether or not the steps that cannot be determined uniquely include the step executed by the input apparatus (i.e., the MFP 10a itself in this case) in S53.

In case of YES in S53, the CPU 101 determines the processing order of the steps that cannot be determined uniquely in S51 so that the step executed by the input apparatus is executed preferentially in S54 and goes back to the former process. In case of NO in S52 or S53, just the same as in the case of S35 in FIG. 8, the CPU 101 determines the processing order of the steps that cannot be determined uniquely in S51 randomly in S55 and goes back to the former process.

The determination by the processing sequence determination process described above corresponds to determining the executing order in the cooperative operation so that time from starting the cooperative operation to finishing the step executed by the input apparatus that inputs information becomes short.

In performing the cooperative operation, it is considered that the input apparatus is operated firstly by user operation often. Therefore, it is highly user-convenient to shorten the waiting time in front of the input apparatus by determining the processing order so that the time until finishing the step executed by the input apparatus becomes short preferably.

Figure 11:
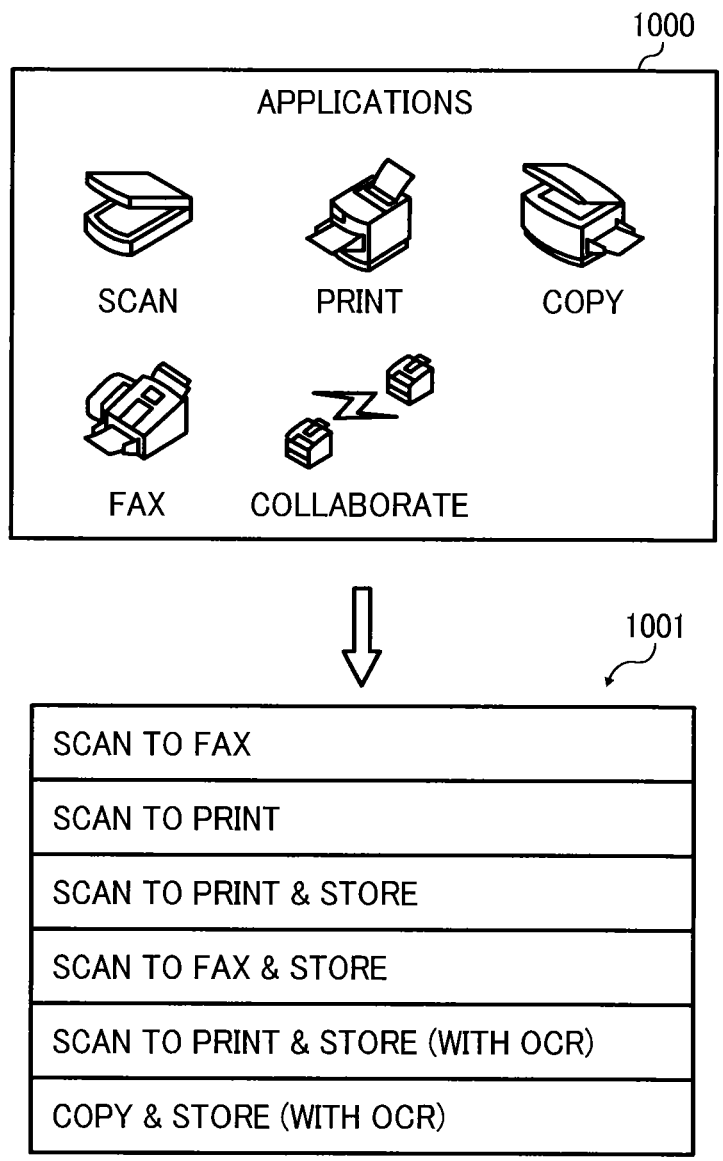
FIG. 11 is a diagram illustrating a screen transition in executing the cooperative process as an embodiment of the present invention.

Here, a case of using the MFP is described below more specifically with reference to figures. It should be noted that the system configuration is similar to FIGS. 1 and 3. In addition, it is assumed that the MFP 10a in FIG. 3 is operated by user operation. FIG. 11 is a diagram illustrating a screen transition in executing the cooperative process in this embodiment.

As shown in FIG. 11, in an initial screen 1000, icons that indicate processes such as scan, copy, FAX, and print that the MFP 10a executes and an icon that indicates the cooperative operation that executes processing in cooperation with other apparatuses are displayed. After the cooperative operation icon is selected by user operation, the MFP 10a displays a screen 1001 that displays a list of the cooperative operations.

"Scan to FAX" is a process that an image is acquired by scanning a document by the MFP 10a and the image is transferred using facsimile by another apparatus. "Scan to Print" is a process that an image is acquired by scanning a document by the MFP 10a and the image is printed out by another apparatus. "Scan to Print & Store" is a process that an image is acquired by scanning a document by the MFP 10a, the image is printed out by another apparatus, and the image acquired by scanning is stored in a storage medium. "Scan to FAX & Store" is a process that an image is acquired by scanning a document by the MFP 10a, the image is transferred using facsimile by another apparatus, and the image acquired by scanning is stored in a storage medium. "Scan to Print & Store (with OCR)" is a process that an image is acquired by scanning a document by the MFP 10*a*, the image is printed out by another apparatus, the image acquired by scanning is performed OCR, and the image performed OCR is stored in a storage medium. "Copy & Store (with OCR)" is a process that an image is copied by the MFP 10*a* (a document is scanned by the MFP 10*a* and the image acquired by scanning the document is printed out by the MFP 10*a*), the image acquired by scanning is performed OCR, and the image performed OCR is stored in a storage medium.

In storing the image data in the storage medium, the storage medium can be included in the MFP 10*a*, the server 20, or the MFP 10*b*. In addition, the storage medium to store the image data can be an internal storage medium inside the apparatus or an external storage medium connected to the apparatus.

Figure 12:
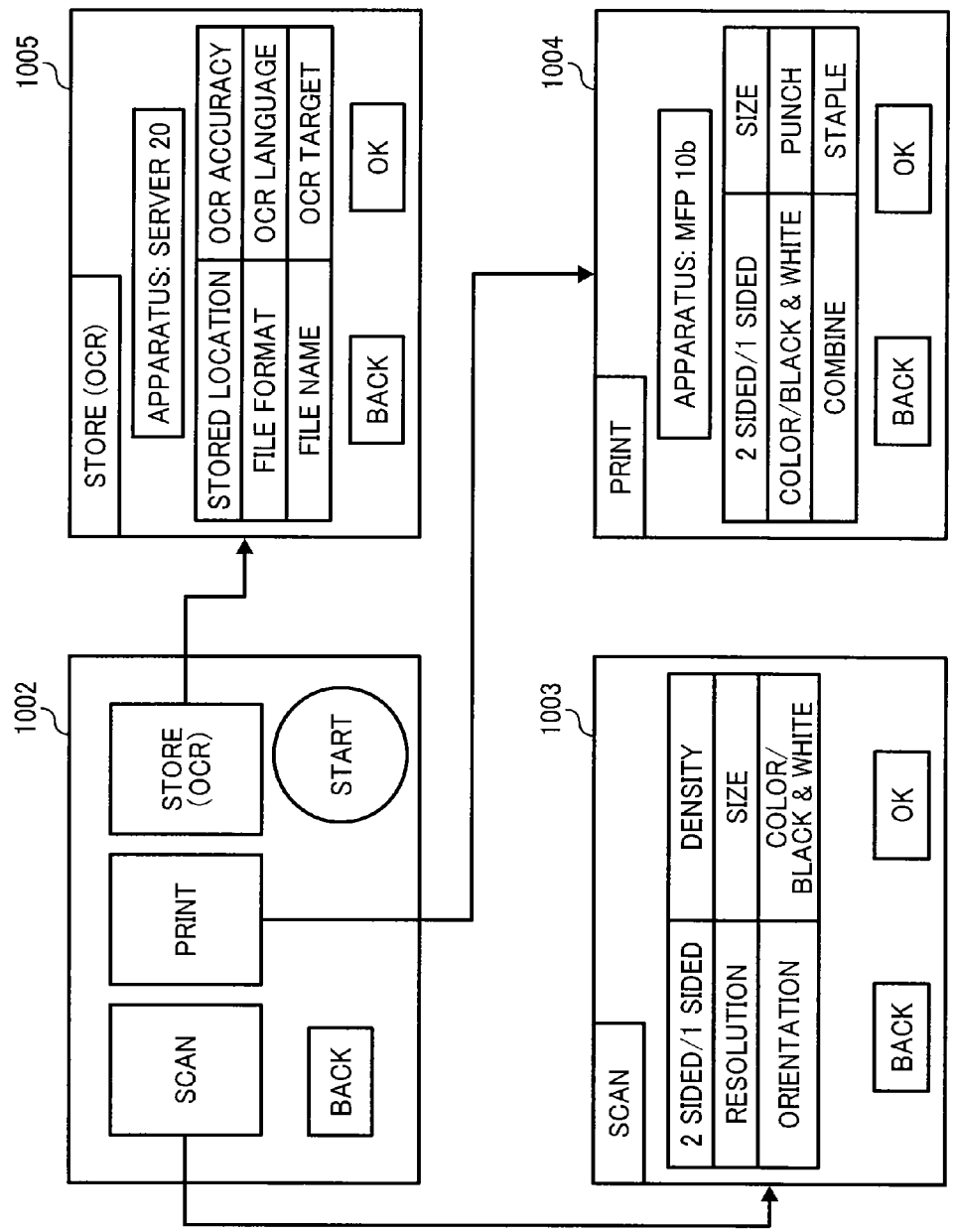
FIG. 12 is a diagram illustrating another screen transition in executing the cooperative process as an embodiment of the present invention.

Here, if "Scan to Print & Store (with OCR)" in screen 1001 is selected, screen 1002 in FIG. 12 is displayed. FIG. 12 is a diagram illustrating a screen transition from configuring in "Scan to Print & Store (with OCR)" to executing printing in this embodiment. If "Scan" is selected in screen 1002, screen 1003 for configuring scanning is displayed. If "Print" is selected in screen 1002, screen 1004 for configuring printing is displayed. If "Store (OCR)" is selected, screen 1005 for configuring storing the image is displayed. The process is executed by selecting "Start" in screen 1002. In this case, the MFP 10*b* prints out an image scanned by the MFP 10*a*, and the scanned image data is stored in the server 20.

After "Start" is selected and the MFP 10*a* accepts the instruction of starting the process, the MFP 10*a* specifies a process to be executed in accordance with the flowchart in FIG. 7. Here, in the case of "Scan to Print & Store (with OCR)", as shown in FIG. 13, four steps are specified.

Step 1: A document is scanned, and image data of the document is generated.

Step 2: OCR process is performed on the image data generated in step 1.

Step 3: The image data that OCR process is performed in step 2 is stored in a designated storage medium.

Step 4: The image data generated in step 1 is printed out.

It is possible that granularity of classifying the process is considered in various ways. For example, steps 2 and 3 described above can be considered as one step "OCR process is performed on the image data and the image data is stored". If steps are implemented on different apparatuses, those steps are specified as separated steps (e.g., regarding steps 2 and 3 described above, they can be implemented on different apparatuses such as an apparatus A executes step 2 and an apparatus B executes step 3.

An execution order determination process is performed regarding steps 1 to 4 described above. First, a case that uses the execution order determination process shown in FIG. 8 is described below. In FIG. 13, it is possible that either "Step 2: OCR" can be performed prior to "Step 4: Print" or "Step 4: Print" can be performed prior to "Step 4: OCR". That is, steps 2 and 4 cannot be determined uniquely. Subsequently, in S33 in FIG. 8, it is determined whether or not an output process is included in the steps that cannot be determined uniquely. In this case, step 4 is a printing process that included in the output process. As a result, the process proceeds to S34 in FIG. 8, and the executing order is determined so that the output process, i.e., "Step 4: Print" is performed preferentially. Here, FIG. 4 is a diagram illustrating the executing order after performing the executing order determination process in FIG. 8.

Next, a case that uses the execution order determination process shown in FIG. 9 is described below. Here, it is assumed that priorities for each step are determined as shown in FIG. 15. In S42 in FIG. 9, steps 2 and 4 that cannot be determined uniquely are specified. After referring to FIG. 15 in S43, priority of step 2 is compared with priority of step 4. Since "Print" has high-priority compared to "OCR", the executing order is determined as shown in FIG. 14. In the above description, each step has priority. However, it is possible to store prioritized steps only (e.g., only "Copy" and "Print" are stored as the prioritized steps.)

Next, a case that uses the execution order determination process shown in FIG. 10 is described below. Here, "Copy & Store (with OCR)" process is taken as an example in the description below. The different point between "Scan to Print & Store (with OCR)" process described above and "Copy & Store (with OCR)" process is that "Step 4: Print" in "Copy & Store (with OCR)" is performed by the MFP 10*a* (the input apparatus) without exception.

In S52 in FIG. 10, steps 2 and 4 that cannot be determined uniquely are specified. Subsequently, in S53 in FIG. 10, it is determined whether or not a process performed by the input apparatus is included in the steps that cannot be determined uniquely. As described above, Step 4 is performed by the input apparatus. Therefore, the process proceeds to S54 in FIG. 10, and the executing process is determined as shown in FIG. 14.

In the embodiment described above, the specific configuration of the apparatuses, the specific sequence of the processes, the number of apparatuses used in the embodiment, and the configuration of data used in the embodiment etc. are not limited to the above description.

For example, in the above description, the document management server 20 stores the document and performs OCR process. However, the MFP 10*a* can perform those functions.

Figure 16:
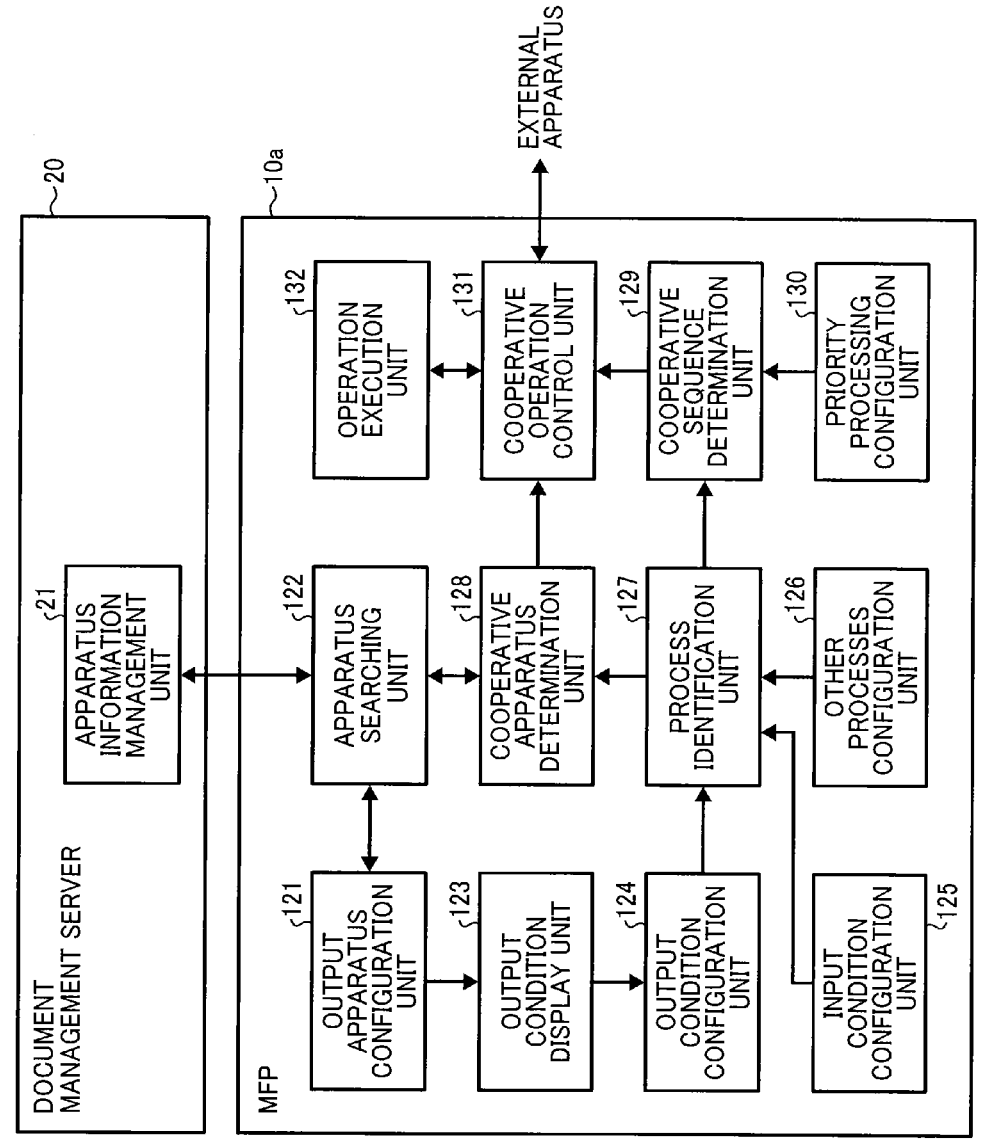
FIG. 16 is a diagram illustrating another configuration of the image processing system as an embodiment of the present invention.

In addition, as shown in FIG. 16, it is possible that the apparatus information management unit 21 in the document management server 20 stores a list of apparatuses available for the cooperative operation and a list of functions that those apparatus can provide. In this case, the apparatus search unit 122 in the MFP 10*a* can inquire of the apparatus information management unit 21 to acquire the information on the apparatuses and functions so that the apparatus search unit 122 can provide the information to other units.

In addition, it is unnecessary that the cooperative operation includes the image scanning process and the image printing process, and the cooperative operation can consist of processes that have no relationship with the image. In this case, it is possible that the apparatus that executes the process has no relationship with the image.

In the embodiment described above, the case that the MFP 10*a* that accepts the configuration regarding the cooperative operation by user operation is involved with the cooperative operation as the input apparatus is explained. However, the embodiment is not limited to that case. It is possible that the apparatus that accepts the configuration is the output apparatus, an apparatus that implements other processes, or an apparatus that does not implement processes in the cooperative operation. If the apparatus that accepts the configuration does not correspond to the apparatus that implements the input process, it is possible to accept selecting the apparatus that implements the input process just like the output apparatus configuration unit 121.

In addition, it is possible that the functions implemented by the MFP 10*a* in the embodiment described above are distributed to multiple information processing apparatuses and the multiple information processing apparatuses cooperate with each other to implement the functions similar to the MFP 10a. The MFP 10a (or multiple cooperating apparatuses) consists of the information processing system in this embodiment. It is possible that an apparatus that implements any process in the cooperative operation is included in the information processing system. It is also possible that the MFP 10a and the document management server 20 shown in FIG. 16 consist of the information processing system in this embodiment.

Figure 17:
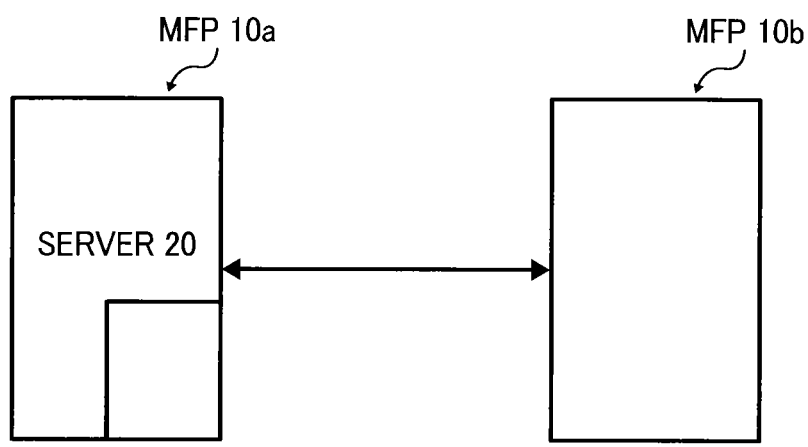
FIG. 17 is a diagram illustrating an image processing system as an embodiment of the present invention.

In addition, it is possible that the MFP 10a includes the function of the server 20 as shown in FIG. 17 for example. Likewise, it is possible that the MFP 10b includes the function of the server 20.

The present invention also encompasses a non-transitory recording medium storing a program that executes an information processing method for the information processing apparatus. The information processing method, performed by the information processing apparatus, includes the steps of accepting a configuration of a cooperative operation to be performed by multiple apparatuses cooperating with each other, determining an executing order of processes included in the cooperative operation, identifying, for each of the processes included in the cooperative operation, an apparatus that performs the process, and instructing the identified apparatuses to execute the processes included in the cooperative operation in the determined executing order.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An information processing apparatus, comprising:
an acceptance unit to accept a configuration of a cooperative operation that performs an input process by an input apparatus, an output process by an output apparatus, and data processing by a data processing apparatus in collaboration with each other on data input from the input apparatus;
a process specifying unit to specify the input process by the input apparatus, the output process, and the data processing in the cooperative operation whose configuration is accepted by the acceptance unit and specify a storing process required for the output process or the data processing;
an execution order determination unit to determine an order of processing of the input process, the output process, the data processing, and the storing process specified by the process specifying unit so that the output process is prioritized;
an apparatus determination unit to identify an apparatus that performs each of the processes included in the cooperative operation; and
a controller to instruct identified apparatuses to execute the processes included in the cooperative operation in the determined order of processing.

2. The information processing apparatus according to claim 1, further comprising a configuration unit to configure a process to be prioritized, wherein the execution order determination unit determines the order of processing so that time from starting the cooperative operation to finishing the prioritized process is minimized.

3. An information processing system, comprising:
circuitry configured to
accept a configuration of a cooperative operation that performs an input process by an input apparatus, an output process by an output apparatus, and data processing by a data processing apparatus in collaboration with each other on data input from the input apparatus,
specify the input process by the input apparatus, the output process, and the data processing in the cooperative operation whose configuration is accepted by the circuitry and specify a storing process required for the output process or the data processing,
determine an order of processing of the input process, the output process, the data processing, and the storing process specified by the circuitry so that the output process is prioritized,
identify an apparatus that performs each of the processes included in the cooperative operation, and
instruct identified apparatuses to execute the processes included in the cooperative operation in the determined order of processing.

4. The information processing system according to claim 3, wherein the circuitry is further configured to configure a process to be prioritized, wherein the circuitry determines the order of processing so that time from starting the cooperative operation to finishing the prioritized process is minimized.

5. The information processing system according to claim 3, wherein
the input apparatus corresponds to a first multifunction peripheral (MFP), the output apparatus corresponds to a second MFP, and the data processing apparatus corresponds to a server, and
the input process corresponds to a scan process, the output process corresponds to a printing process, and the data processing corresponds to optical character recognition processing.

6. An information processing method performed by one or more processors, the method comprising:
accepting a configuration of a cooperative operation that performs an input process by an input apparatus, an output process by an output apparatus, and data processing by a data processing apparatus in collaboration with each other on data input from the input apparatus;
specifying the input process by the input apparatus, the output process, and the data processing in the cooperative operation whose configuration is accepted by the accepting and specify a storing process required for the output process or the data processing;

determining an order of processing of the input process, the output process, the data processing, and the storing process specified by the specifying so that the output process is prioritized;
identifying an apparatus that performs each of the processes included in the cooperative operation; and
instructing identified apparatuses to execute the processes included in the cooperative operation in the determined order of processing.

* * * * *